United States Patent
Protasova et al.

(10) Patent No.: US 10,695,743 B2
(45) Date of Patent: Jun. 30, 2020

(54) DEVICES FOR THROUGH-FLOW OF FLUIDS COMPRISING GRADED POROUS STRUCTURES

(71) Applicant: VITO NV, Mol (BE)

(72) Inventors: Lidia Protasova, Mol (BE); Frans Snijkers, Mol (BE); Simge Danaci, Nivelles (BE); Alain Bengaouer, Grenoble (FR); Pierre Baurens, Grenoble (FR); Jasper Lefevere, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 16/499,222

(22) PCT Filed: Mar. 29, 2018

(86) PCT No.: PCT/EP2018/058243
§ 371 (c)(1),
(2) Date: Sep. 27, 2019

(87) PCT Pub. No.: WO2018/178312
PCT Pub. Date: Oct. 4, 2018

(65) Prior Publication Data
US 2020/0101435 A1    Apr. 2, 2020

(30) Foreign Application Priority Data
Mar. 29, 2017    (EP) .................... 17163707

(51) Int. Cl.
*B01J 19/24*    (2006.01)
*B01J 12/00*    (2006.01)
(Continued)

(52) U.S. Cl.
CPC ......... *B01J 19/2485* (2013.01); *B01J 12/007* (2013.01); *B01J 19/32* (2013.01);
(Continued)

(58) Field of Classification Search
CPC .............. B01J 12/007; B01J 2219/2406; B01J 2219/2047; B01J 2219/2409;
(Continued)

(56) References Cited

U.S. PATENT DOCUMENTS

2011/0129640 A1   6/2011   Beall et al.
2012/0102706 A1   5/2012   Gallagher et al.

OTHER PUBLICATIONS

Jun. 15, 2018, International Search Report and Written Opinion from the European Patent Office in PCT/EP2018/058243, which is the international application to this U.S. application.

*Primary Examiner* — Lessanework Seifu
(74) *Attorney, Agent, or Firm* — Kolitch Romano LLP

(57) ABSTRACT

A device for the through-flow of a fluid may include a fluid inlet and a fluid outlet. A porous structure with interconnected pores is arranged between the fluid inlet and the fluid outlet, and the fluid inlet and the fluid outlet define an overall flow direction. The porous structure is coupled to a wall to provide for heat conduction between the porous structure and the wall. The porous structure has a porosity gradient along a first direction, which is cross to the overall flow direction. The porosity gradient develops along the first direction between a first porosity at a first location proximal to the wall and a second porosity larger than the first porosity at a second location remote from the wall. The difference between the second porosity and the first porosity may be at least 4%.

17 Claims, 7 Drawing Sheets

(51) Int. Cl.
  *B01J 19/32* (2006.01)
  *C10L 3/08* (2006.01)
(52) U.S. Cl.
  CPC ........... *C10L 3/08* (2013.01); *B01J 2219/243* (2013.01); *B01J 2219/2406* (2013.01); *B01J 2219/2408* (2013.01); *B01J 2219/2409* (2013.01); *B01J 2219/2428* (2013.01); *B01J 2219/2435* (2013.01); *B01J 2219/2445* (2013.01); *B01J 2219/2446* (2013.01)
(58) Field of Classification Search
  CPC .......... B01J 2219/2428; B01J 2219/243; B01J 2219/2434; B01J 2219/2435; B01J 2219/2445; B01J 2219/2446
  See application file for complete search history.

DEVICES FOR THROUGH-FLOW OF FLUIDS COMPRISING GRADED POROUS STRUCTURES

TECHNICAL FIELD

The present disclosure is related to devices in which a fluid flows through and wherein a heat transfer takes place between the fluid and the device. Non-limiting applications are heat exchangers and chemical reactors.

BACKGROUND ART

Exothermic and endothermic reactions such as Fischer-Tropsch synthesis (FTS), methane steam and dry reforming, methanation, methanol synthesis, and combustion reactions are important reactions for the production of valuable chemicals. So far, catalytic reactions have been widely investigated in fixed-bed and fluidized bed reactors with conventional catalytic materials. The packed-bed reactor is the most commonly used reactor type. The main disadvantages of a packed bed reactor are formation of hot spots in the catalyst bed and heat management problems (heat transfer limitation etc.). The hot spots lead to sintering and carbon deposits which result in a decrease in the amount of active sites. Besides the abovementioned limitations, pressure drop and mass transfer are limiting parameters for an efficient reaction.

In recent years, structured catalytic reactors draw a great interest for overcoming the above-mentioned limitations (mainly temperature regulation limitation, scale up limitation due to poor temperature control, catalysts deactivation and pressure drop). One of the examples is the use of the metal based structured catalysts such as metallic monoliths made by additive manufacturing due to their better heat transfer properties. These materials are made of micrometre-sized highly conductive fibers in which various reactive materials including catalysts are immobilized. Micro fibrous materials enable temperature control and provide uniform temperature profile for a range of highly endo/exothermic chemical reactions. One advantage of structured monoliths is that the porosity and pore size distribution can be controlled. This is in contrast to e.g. packed bed or foam materials, which have an inherent large pore size distribution.

It is known from US 2011/0129640 to Beall et al., 2 Jun. 2011 to make highly porous three dimensional (3D) ceramic articles from 3D powder printing. The articles can have apparent porosities from about 48% to 67% and can be used for flow applications. The 3D article can be constructed having a wall (e.g., solid, porous, or skinned), a honeycomb-like interior having macro porosity that can have, for example a porous lattice spacing that has graded or graduated dimension that decrease from larger cells at the periphery to smaller cells near the center which can create a radial profile to counteract peripheral pressure drop. The document describes that such graded structure can be used to level or equalize the flow front resulting in improved utilization of catalyst or radial ash distribution in such flow applications.

SUMMARY

High surface area, high macro-porosity, improved heat and mass transfer are crucial for designing efficient reactors for exothermic and/or endothermic processes. However, the above reactor designs do not solve problems related to hot-spot formation and catalyst deactivation in the reactor. A same reasoning applies to heat exchangers, where heat transfer for a given volume should be maximized.

It is an aim of the present disclosure to maximize heat transfer per unit volume in a fluid flow device in which conductive heat exchange takes place. It is an aim of the disclosure to improve the efficiency of heat transfer in such fluid flow devices.

It is additionally an aim of the present disclosure to address problems related to hot spot formation and/or catalyst deactivation, particularly in chemical reactors.

According to a first aspect of the disclosure, there is therefore provided a device as set out in the appended claims. The device comprises a vessel which comprises a wall, a fluid inlet, and a fluid outlet. The device further comprises a porous structure arranged in the vessel between the fluid inlet and the fluid outlet. The porous structure comprises interconnected pores. The fluid inlet and the fluid outlet hence define an overall flow direction through the porous structure. The porous structure is advantageously (thermally) coupled to the wall. This advantageously provides for heat conduction between the porous structure and the wall. Further mechanisms may be provided for heat transfer between the wall and a further, e.g. external, medium. The wall can be a solid wall, which is advantageously nonporous and/or advantageously impermeable for the fluid. Alternatively, the wall can be porous.

According to an aspect, the porous structure comprises a porosity gradient along a direction, referred to as gradient direction. The gradient direction is advantageously cross to the overall flow direction. The gradient direction advantageously lies in a plane perpendicular to the overall flow direction.

According to another aspect, the porosity gradient develops along the gradient direction between a first porosity at a first location proximal to the wall and a second porosity at a second location remote from the wall as compared to the first location. Advantageously, a difference between the first porosity (volume porosity, expressed in percentage) and the second porosity (volume porosity, expressed in percentage) is at least 4%, advantageously at least 5%, advantageously at least 6%, with the second porosity being advantageously larger than the first porosity.

It has been observed that devices including porous structures of the above kind allow for an improved conductive heat transfer between inner parts of the porous structure and peripheral parts of the porous structure close to the vessel wall. Heat can be better transferred between the inner parts of the porous structure and the vessel wall due to the porous structure which is more dense in proximity of the vessel wall. This is beneficial for a heat transfer in both directions, i.e. both for draining heat from the fluid, and for adding heat to the fluid. Furthermore, it has been observed that such porosity gradient affects the flow resistance through the structure only in a minor way, as compared to structures with higher homogeneous porosity.

It should be noted that the above porosity gradient can be combined with porosity gradients along other directions to provide improved results. By way of example, the porous structure can additionally be provided with a porosity gradient along the direction of flow in the vessel, in particular one with decreasing porosity from the inlet towards the outlet.

According to a second aspect of the disclosure, there is provided a use of devices of the above kind as set out in the appended claims. Such devices can be used as chemical reactors, in particular for exothermal reactions, such as the catalytic conversion of carbon dioxide to methane.

BRIEF DESCRIPTION OF THE DRAWINGS

Aspects of the disclosure will now be described in more detail with reference to the appended drawings, wherein same reference numerals illustrate same features and wherein.

DETAILED DESCRIPTION

Figure 1:
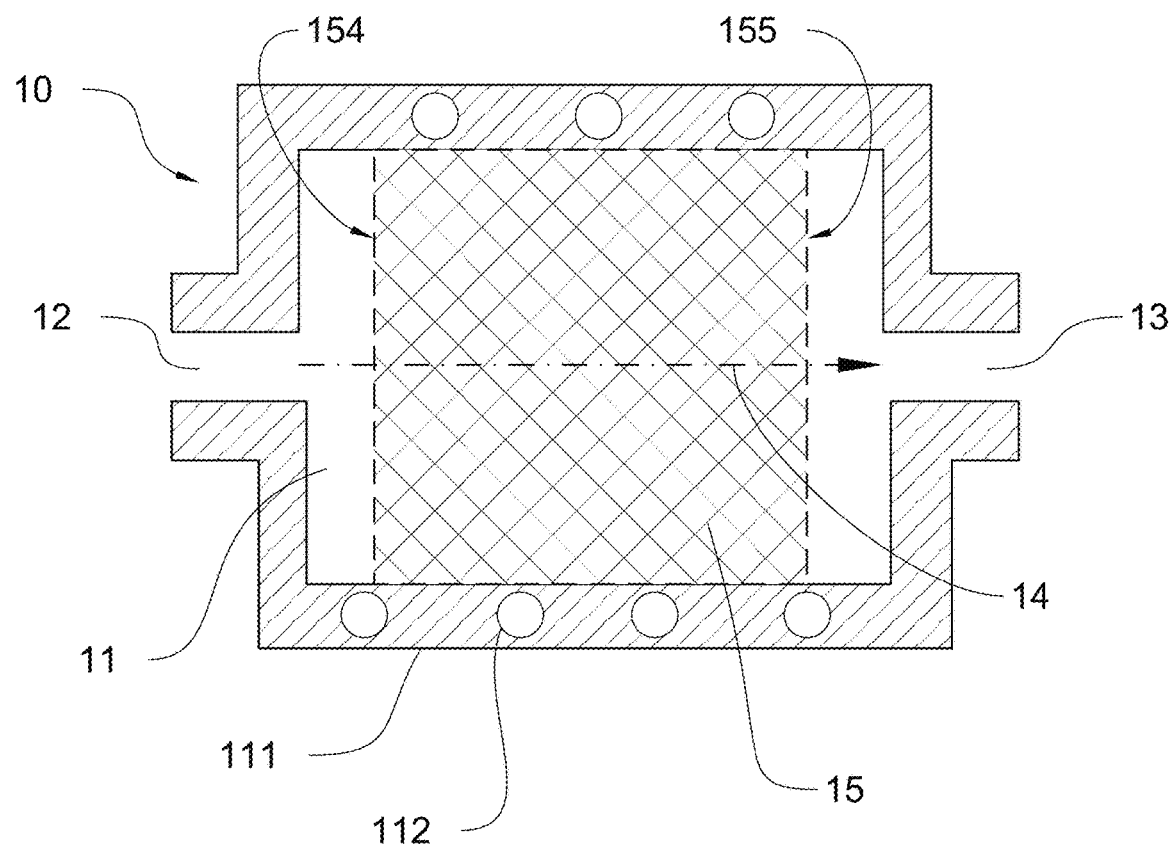
FIG. 1 represents a longitudinal sectional view of a device for through-flow of a fluid according to aspects of the disclosure, with a vessel having a fluid inlet and a fluid outlet, and with a porous structure arranged in the vessel through which the fluid is configured to flow.

FIG. 1 depicts a typical design of a device 10 according to aspects of the disclosure, which may be a chemical (continuous flow) reactor, or a heat exchanger. Device 10 comprises a vessel 11, which is advantageously though not necessarily closed, except for a fluid inlet 12 and a fluid outlet 13. The position of the fluid inlet and fluid outlet is not particularly critical. Their position however defines a direction 14 of overall fluid flow, from the inlet 12 towards the outlet 13. The vessel 11 may have any shape, such as cylindrical, or prismatic.

An advantageously monolithic porous structure 15 is arranged inside the vessel 11, in such a way that the fluid entering the vessel from the inlet 12 flows through the porous structure 15 before reaching the outlet 13. The pores of the porous structure 15 are therefore interconnected. The porous structure 15 may fill the vessel 11 completely or in part. In such a configuration, heat transfer between the fluid and the solid material of the structure 15 and the vessel 11 will principally take place by conduction with less important contributions from convection and radiation. Contribution from these different mechanisms of heat transfer may depend on e.g. the structural geometry and the reaction temperature. Therefore, the porous structure 15 is advantageously in good thermal contact with a wall 111 of the vessel 11, which may be obtained by appropriate fixation or attachment of the structure 15 to the wall 111. The porous structure 15 is therefore advantageously immobilised in vessel 11. Appropriate heat transfer mechanisms may be integrated or attached to the vessel wall, such as cooling or heating channels 112, or heating/cooling fins (not shown).

It will be convenient to note that aspects of the disclosure are not limited to devices of the above kind, and heat exchanging devices of other shapes may be contemplated, e.g. where the vessel is replaced by a wall to which the porous structure is attached, the porous structure being open for fluid flow on at least three, advantageously five sides.

The structure 15 is advantageously highly porous so as to minimize pressure drop through the vessel 11. Monolithic highly porous structures can be obtained by well-known additive manufacturing techniques, such as three-dimensional fiber deposition, three-dimensional powder deposition or similar solid free-form fabrication techniques. In most typical cases and referring to FIG. 2, the porous structure 15 is built as a stack of layers 151, 152, 153, etc., each layer being formed of an arrangement of fibers 16 or filaments. These fibers or filaments can be extruded as a paste from a nozzle, as is the case with 3-D fiber deposition, or can be 3-D printed starting from a powder layer which can e.g. be selectively melted (selective laser sintering), or selectively bound with an adhesive (3-D printing).

3D fiber deposition (3DFD) (also called direct-writing or robocasting) comprises the extrusion of an advantageously highly viscous paste loaded with metallic or ceramic particles through a thin nozzle. In this case, the paste comprises a powder, such as a metallic or ceramic powder, or a combination of both, an organic binder, optionally a rheology modifier and optionally an inorganic binder, such as a colloidal binder. By computer controlled movement in x, y and z-direction, the porous architecture is built layer-by-layer. The x and y directions typically refer to the plane of the layers, whereas the z-direction is the direction of stacking of the layers (perpendicular on the plane of the layers). This process can involve multiple nozzles or a single nozzle. The green part which is obtained by the above process can be post-processed in one or two steps: an optional drying step followed by sintering. Sintering may be carried out under vacuum conditions, or in an inert or reducing atmosphere, e.g. to avoid oxidation in case of metals. After sintering, a highly reproducible and periodic porous structure is obtained. The process variables include the nozzle opening (fiber thickness or diameter), the type of nozzle (fiber shape), the inter-fiber distance (pore size) and the stacking of the layers (architecture). The microporosity and surface roughness of the fibers can be controlled. An equipment for 3DFD typically comprises a paste reservoir with nozzle, mounted on an apparatus with numerical control of three or more axes, e.g. an XYZ-table or a CNC machine. Multiple nozzles can be mounted onto the equipment so as to speed up the production of similar pieces.

Fibers 16 of consecutive layers advantageously extend along mutually transverse directions and the fibers within the same layer are advantageously spaced apart. As a result, a highly porous structure can be obtained. The fibers are advantageously, though not necessarily arranged in an orderly fashion. By way of example, fibers 16 within the same layer can be parallel, be concentric in circles, extend radially from a common center, or spirally.

Advantageous porous structures 15 may comprise longitudinal channels extending from one end of the structure (e.g., the inlet end 154) to an opposite end of the structure (e.g., the outlet end 155). These longitudinal channels may be straight or tortuous. The tortuosity may be defined by staggering the fibers in those layers wherein the fibers are mutually parallel, as shown e.g. in FIG. 3. The size, disposition and interconnectivity of the longitudinal channels define to a large extent the flux and pressure drop through the porous structure.

Figure 2:
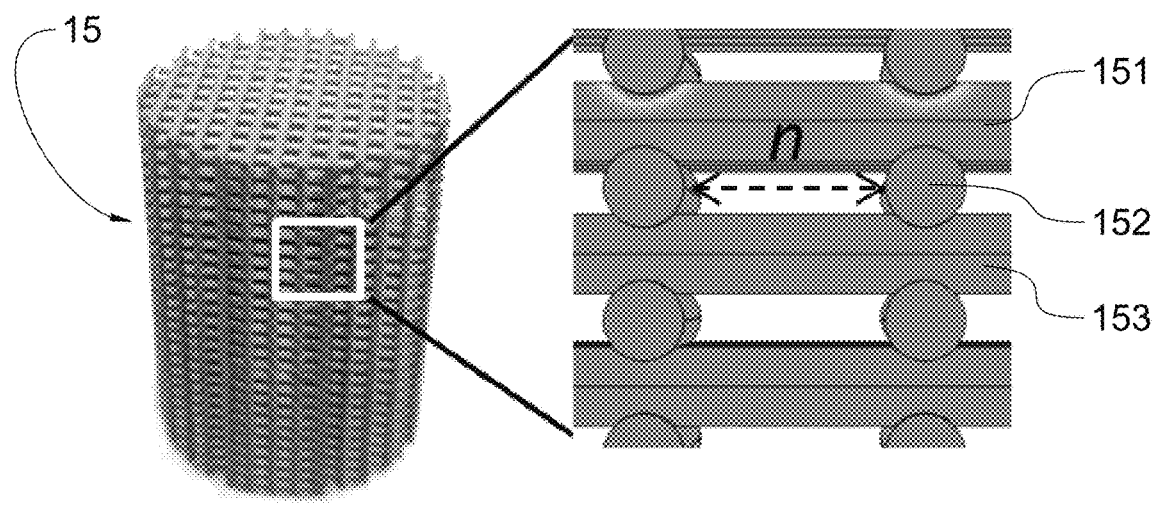
FIG. 2 represents an example of a porous structure that can be placed in the vessel depicted in FIG. 1.
Figure 3:
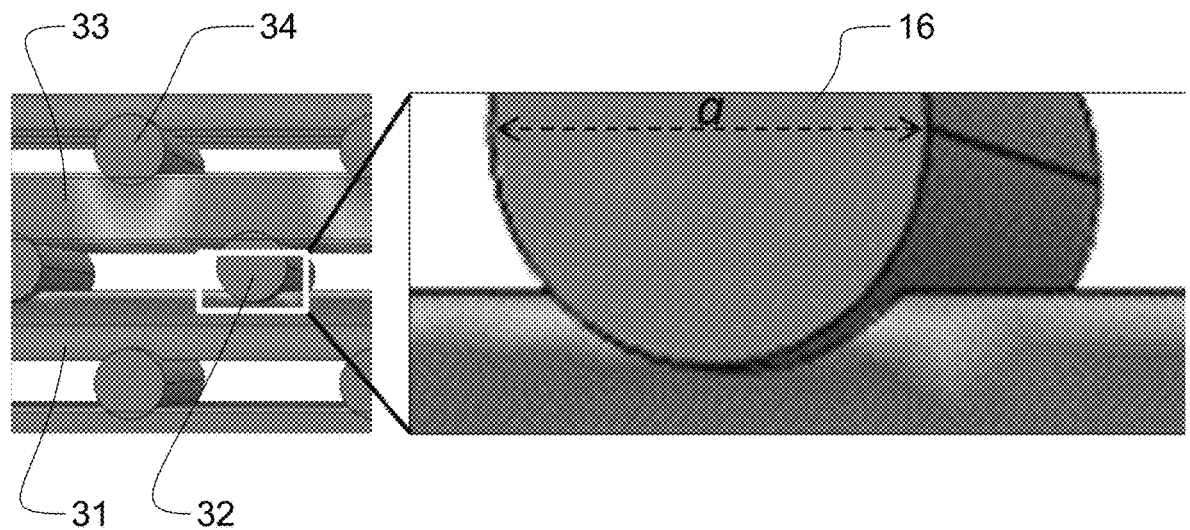
FIG. 3 represents an alternative manner of stacking fibers for obtaining a porous structure that can be placed in the vessel.

The structure of FIG. 2 is formed by a repeating pattern of two consecutive layers. Fibers in one layer are perpendicular to the ones in the other layer. The pattern is repeated in the build direction without staggering of the fibers, i.e. corresponding fibers are aligned in the build (vertical) direction. The structure of FIG. 3 is formed by a repeating pattern of four consecutive layers. Fibers of consecutive layers are perpendicular to each other and fibers within a same layer are parallel to one another. Unlike the pattern of FIG. 2, the fibers are staggered in those layers having mutually parallel fibers. That is, fibers of layer 34 are staggered with respect to fibers of layer 32. The fibers of layers 31 and 33 can or cannot be staggered. It will be convenient to note that many more structures can be obtained by changing the staggering distance.

Figure 4:
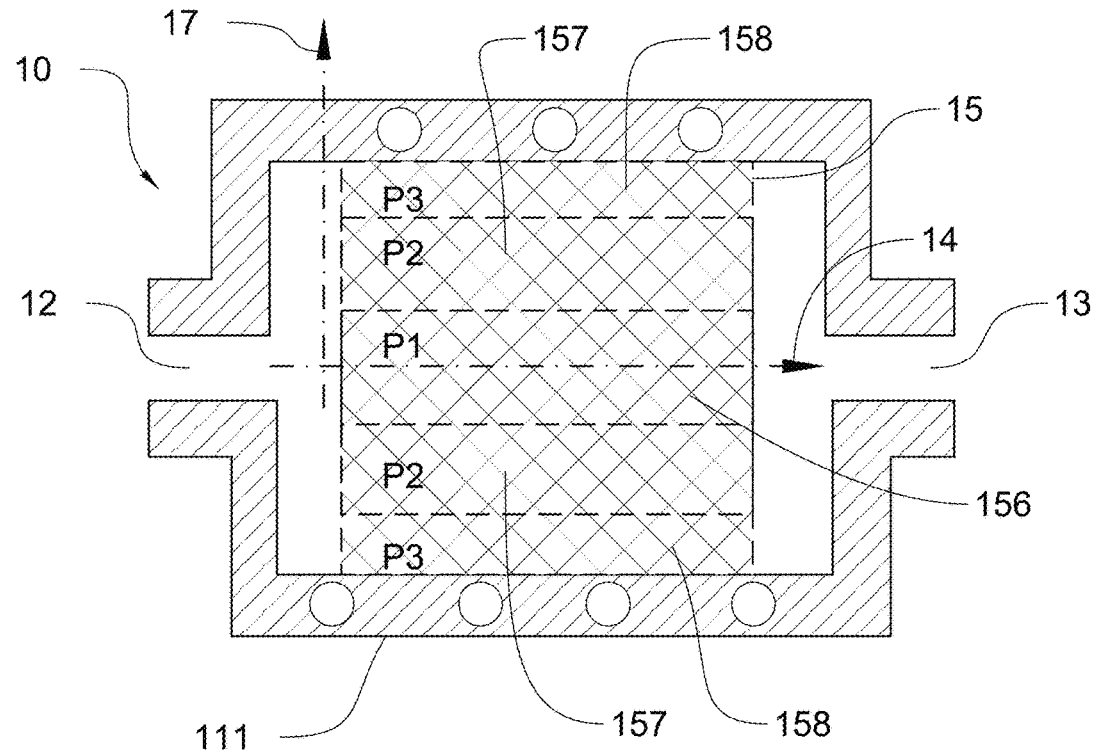
FIG. 4 represents the device of FIG. 1 in longitudinal sectional view, in which the porosity gradient of the porous structure in a radial direction according to aspects of the disclosure is depicted.

According to an aspect, a porosity gradient is provided in the porous structure 15. That is, along a direction, referred to as gradient direction, the porosity, and therefore also the density of the structure 15, is made to change. The gradient direction advantageously lies in a plane which is transverse to the direction of flow 14, e.g. a plane perpendicular or oblique to it. Referring to FIG. 4, a porosity gradient in a direction 17 orthogonal to the direction of flow 14 is applied in structure 15. Direction 17 may be a radial direction. By way of example, a central region 156 of structure 15 is provided with a porosity P1. A peripheral region 158 of structure 15 is provided with porosity P3, which may be different from P1. An intermediate region 157 between regions 156 and 158 may be provided with porosity P2, with P2 different from P1 and P3. According to an aspect, the porosity changes along direction 17 from a higher porosity P1 and hence lower density of the structure 15 in a central region 156 to a lower porosity P3 and hence a higher density of structure 15 in a peripheral region 158. Advantageously, the porosity gradient is one with a porosity decreasing towards the periphery of the structure 15. In other words, P1>P2>P3.

It has been observed that reducing porosity towards the periphery of the porous structure 15 improves the heat transfer between the central regions of the porous structure and the vessel wall 111. As a result, heat generated in the central region, e.g. due to an exothermal reaction, can be better dissipated resulting in reduced temperatures in the central region and hence avoiding catalyst deactivation. Likewise, in case of heat transfer towards the fluid flowing through the porous structure 15, the reduced porosity and hence increased density of the peripheral regions will allow for improved heat flux towards the central regions. The stated advantages therefore do not only apply to chemical reactors, but principally to all devices in which heat is transferred between the fluid and the device, e.g. a heat exchanger.

Figure 5:
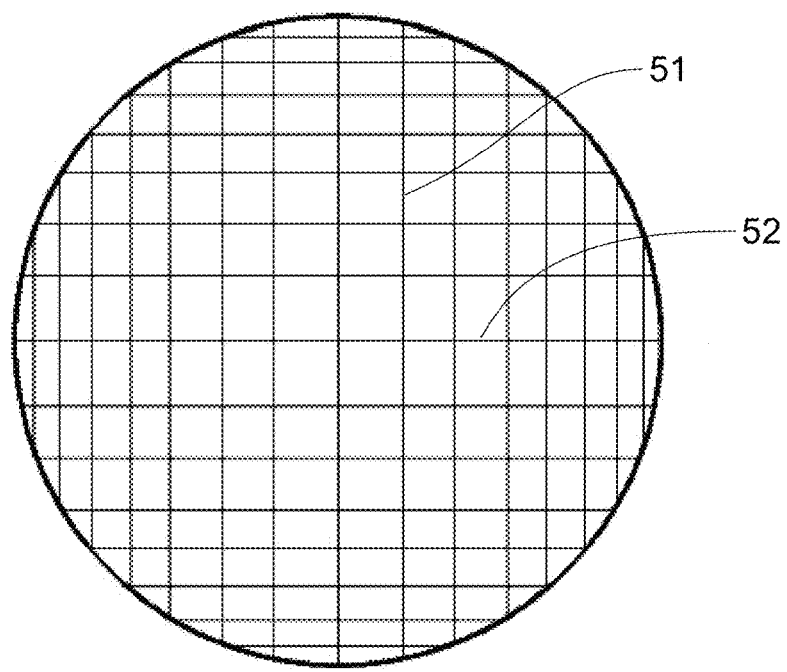
FIG. 5 represents a first fiber disposition scheme for the porous structure of FIG. 4 according to aspects of the disclosure, with larger pores in a central region and smaller pores towards the periphery.
Figure 6:
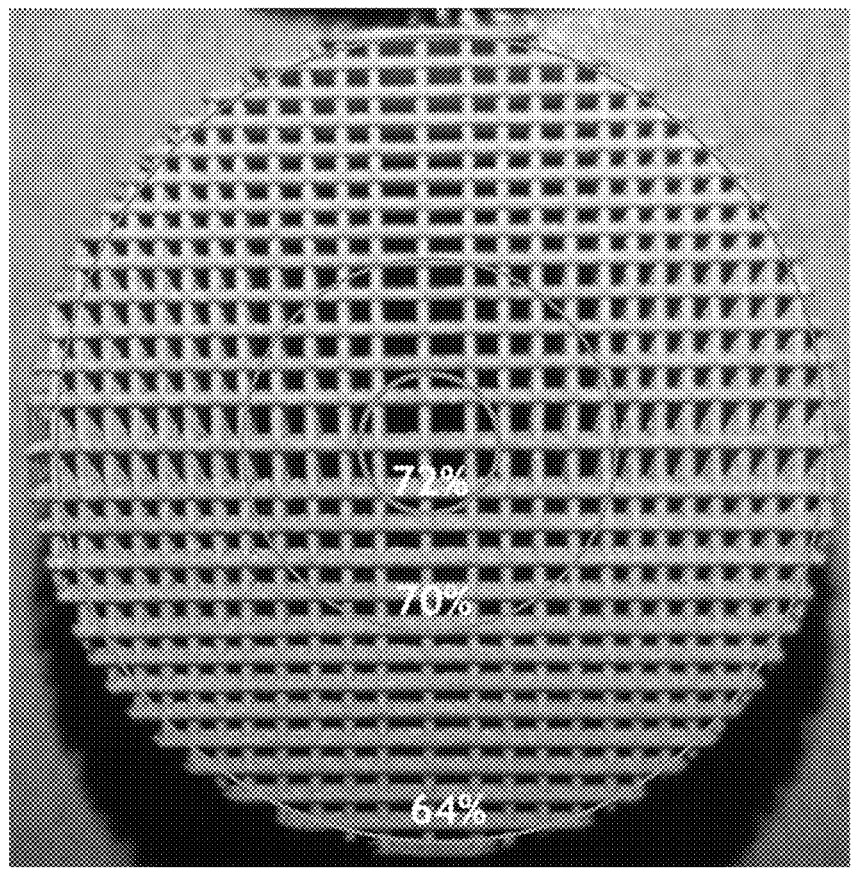
FIG. 6 represents a top view of a porous structure made according to the scheme of FIG. 5, with the fiber layers being parallel to the plane of the figure.

Additive manufacturing techniques allow for easily and effectively making monolithic structures with desired porosity gradients. For porous structures built up out of an arrangement of fibers, the easiest way of obtaining a porosity gradient is through changing the spacing between (parallel) fibers within some or all layers. One example is shown in FIG. 5 showing the disposition of the fibers as seen from a direction orthogonal to the layers. In FIG. 5, the fibers within a same layer are disposed parallel to one another and the fibers 51 and 52 of consecutive layers are orthogonal to one another. It can be observed that in each layer, the spacing between adjacent fibers is reduced from the center of the structure towards the periphery, i.e. in a direction orthogonal to the longitudinal axis of the fiber. Examples of such fiber disposition are shown in FIG. 6 for a cylindrical structure and in FIG. 7 for a prismatic structure. Alternative schemes in which the spacing between adjacent fibers changes in only one of two or more alternating layers can be contemplated as well, e.g. referring to FIG. 5, it can be contemplated to arrange fibers 51 with changing (graded) spacing as shown, whereas fibers 52 arranged in the alternate layer and extending cross to fibers 51 would be arranged with constant spacing.

Figure 9:
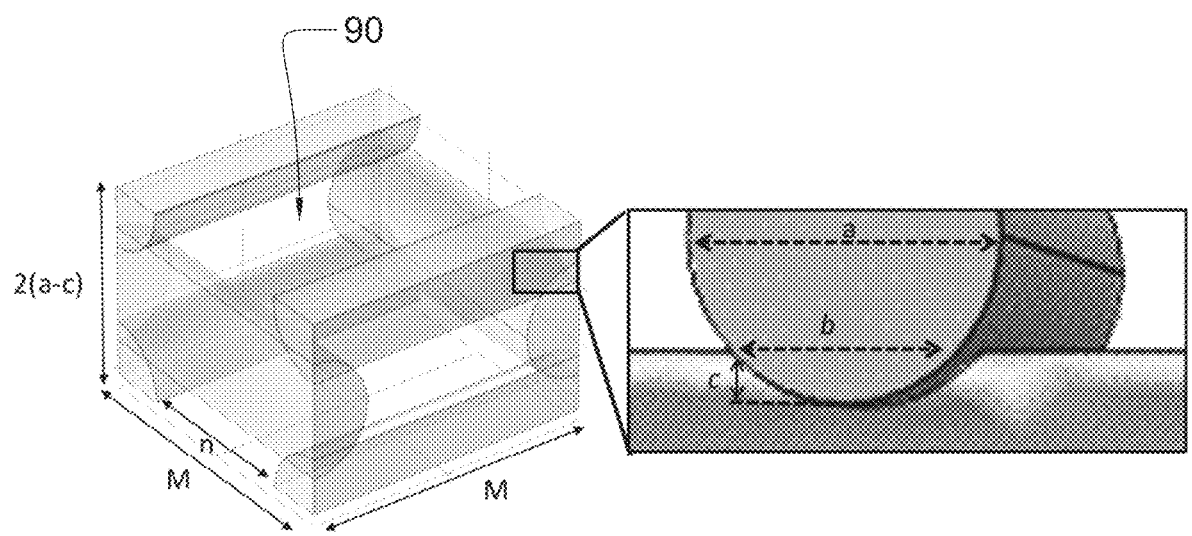
FIG. 9 represents a unit pore cell as defined in a fiber disposition according to the scheme of FIG. 5.

In the above figures it can be observed that the pores have a decreasing size along a direction from an inner region towards the periphery. In this regard, a pore can be regarded as a cell delimited on all sides by fibers, as shown in FIG. 9.

Figure 8:
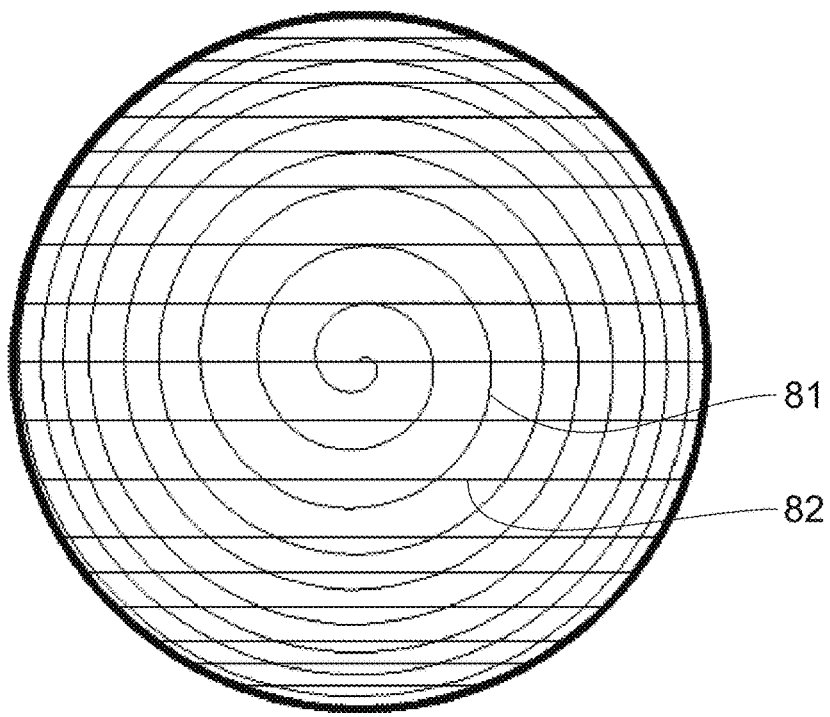
FIG. 8 represents a second fiber disposition scheme for the porous structure of FIG. 4 according to aspects of the disclosure, with larger pores in a central region and smaller pores towards the periphery.

Alternatively, or in addition a porosity gradient can be obtained through an appropriate manner of disposition of the fibers, e.g. spiral fibers, zigzag fibers, etc. FIG. 8 shows one example of fiber arrangement in which fibers 81 are disposed spirally in one layer. In the consecutive layer, fibers 82 can be disposed parallel to one another, or according to any other ordered disposition. According to one aspect of the disclosure, the spiral fiber 81 has a decreasing spacing between adjacent spiral turns towards the periphery of the structure. Also with these fiber dispositions, there will be larger pores in the inner regions of the structure and smaller pores towards the periphery.

Figure 10:
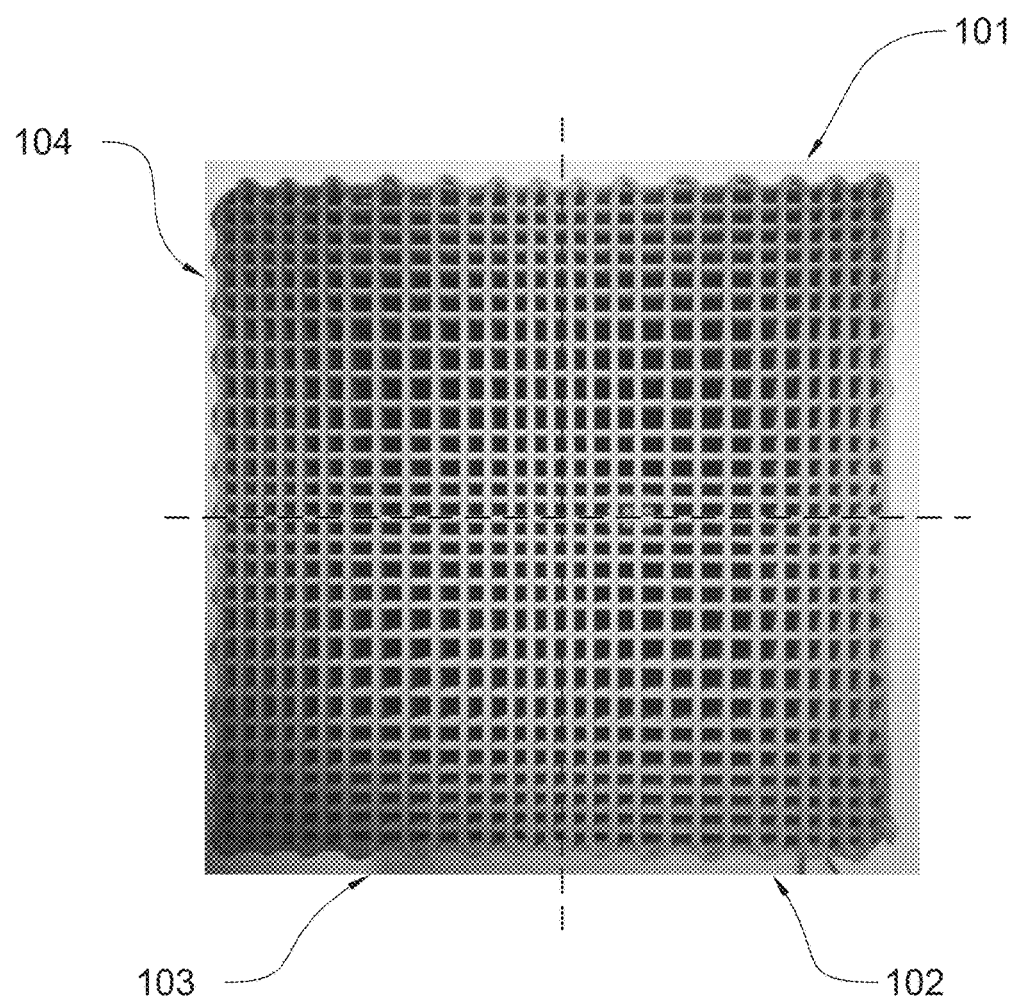
FIG. 10 represents a top view of a porous structure having a cross section with four identical quadrants, wherein each quadrant has a fiber disposition scheme according to that of FIG. 5.

Yet another possible arrangement of fibers according to aspects of the disclosure is shown in FIG. 10. Here, the cross section of the porous structure is divided in four quadrants 101-104, and the scheme of FIG. 5 is applied to each of the four quadrants. Aspects of the disclosure therefore also contemplate a porosity gradient with decreasing porosity from any appropriate inner region of the structure towards the periphery.

According to aspects of the disclosure, the difference (i.e. the change) in porosity (expressed as a percentage) along the gradient direction is at least 4%, advantageously at least 5%, advantageously at least 6%, advantageously at least 8%, advantageously at least 10%. In other words, assuming the porosity is P1(%) at a first location along the gradient direction, and P2(%) at a second location, the difference in porosity $\Delta P$ (%)=P1−P2. The gradient may evolve from a porosity between 40% and 85%, advantageously between 50% and 75% close to the wall to a porosity between 45% and 90%, advantageously between 55% and 80% at locations remote from the wall.

The local porosity can be determined based on the geometry of a unit pore cell 90 as shown and defined in FIG. 9. The stacking factor c refers to the interpenetration depth between fibers of consecutive layers. The stacking factor is obtained, e.g. during build of a 3DFD structure but is analogous with other additive manufacturing processes, by increasing the (vertical) build height by an amount less than the fiber diameter, when starting a new layer on top of the previous one. The fiber diameter can be determined by optical microscopy or Scanning Electron Microscope imaging of a cross-section of the material and is mainly determined by the nozzle diameter of the 3DFD apparatus, printing conditions and the shrinkage upon sintering. The stacking factor c may be influenced by the paste composition (e.g. viscosity), fiber thickness, inter-fiber distance and printing conditions such as temperature and humidity. The stacking factor has a strong influence on the mechanical strength and the heat conductivity through the fibers, but also influences the macroporosity and the interconnectivity of the macropores. In the examples presented below, c~0.068 mm was measured by way of a Scanning Electron Microscope imaging. Further, a=M−n is fiber diameter (mm), n is inter-fiber distance (mm) and M is axial center spacing between two fibers (mm). The macroporosity (P, %) of the cell can be calculated as follows, with SSA being the specific surface area (SSA, $mm^2/mm^3$), $S_c$ is the loss of the surface area of two connected fibers ($mm^2$), $S_f$ is surface area of the two fibers ($mm^2$), $V_{cell}$ is the unit cell volume ($mm^3$) and $V_{fibre}$ is the fiber volume ($mm^3$):

$$b = 2\sqrt{2ac - c^2} \text{ (mm)} \quad \text{(Eq. 1)}$$

$$S_c = \frac{\pi a * b}{4} \text{ (mm}^2\text{)}$$

$$S_f = \pi M a \text{ (mm}^2\text{)}$$

$$V_{cell} = 2(a-c)M^2 \text{ (mm}^3\text{)}$$

$$V_{fibre} = \frac{\pi M a^2}{4} \text{ (mm}^3\text{)}$$

$$SSA = \frac{2(S_f - 2S_c)}{V_{cell}} \text{ (mm}^2/\text{mm}^3\text{)}$$

$$SSA = \frac{\pi a \left(M - \sqrt{2ac - c^2}\right)}{M^2(a-c)} \text{ (mm}^2/\text{mm}^3\text{)}$$

$$P = \left(1 - \frac{2V_{fibre} - V_c}{V_{cell}}\right) * 100 \text{ (\%)}$$

with $V_c$ the volume of the intersection of two fibers with same fiber diameters a.

$V_c$ depends on the stacking factor c. The stacking factor c can be in the range $0 \leq c \leq a$. While c=a, $V_c$ is a "Steinmetz solid". Therefore, $$V_c = \frac{16}{3}\left(\frac{a}{2}\right)^3.$$

While c is 0<c<a, a circular cone volume can be assumed for simplifying the calculation of $V_c$, which is an approximation of the real elliptic cone volume. Assuming a circular cone volume:

$$V_c = 2V_{cones}$$

$$V_{cones} = 2\pi\left(\frac{b}{2}\right)^2 \frac{c}{3}.$$

Reference to porosity in the present description relates to macroporosity, e.g. porosity between the fibers disregarding porosity of or within the fibers. Advantageously, macropores have a pore size of at least 10 μm in diameter, advantageously a pore size of at least 25 μm, advantageously at least 50 μm, advantageously at least 100 μm. Absolute (macro) porosity values in structures according to aspects of the disclosure are not particularly limiting. Advantageous values are between 40% and 90% porosity, advantageously between 50% and 80%. Average (macro)porosity values of porous structures according to present aspects are advantageously between 50% and 80%, advantageously between 55% and 75%.

In porous structures according to aspects of the disclosure, the fibers advantageously have a diameter a in the range between 20 μm and 20 mm, advantageously between 40 μm and 10 mm, advantageously between 60 μm and 5 mm, with advantageous values being 80 μm, 100 μm, 200 μm, 400 μm, 600 μm, 800 μm, 1 mm, 2 mm. All fibers within a same layer of the structure typically have a same diameter, and the fiber diameter may be the same in all layers of the structure. The inter fiber distance n, e.g. within a same layer, may vary between 0 μm and 50 mm, and is advantageously between 10 μm and 25 mm, advantageously between 25 μm and 10 mm, advantageously between 50 μm and 5 mm, advantageously between 100 μm and 2.5 mm, advantageously smaller than or equal to 1.5 mm, or smaller than or equal to 1 mm. The fiber interdistance typically changes within one layer so as to obtain the porosity gradient. The stacking factor c may vary between 0 and the fiber diameter a, advantageously $0.01a \leq c \leq 0.99a$, advantageously $0.02a \leq c \leq 0.90a$, advantageously $0.03a \leq c \leq 0.50a$, advantageously $0.05a \leq c \leq 0.20a$. Advantageously, the ratio c/a is at least 0.075, at least 0.1, at least 0.125, at least 0.15. The stacking factor typically is constant within one layer, and may change between layers.

Figure 7:
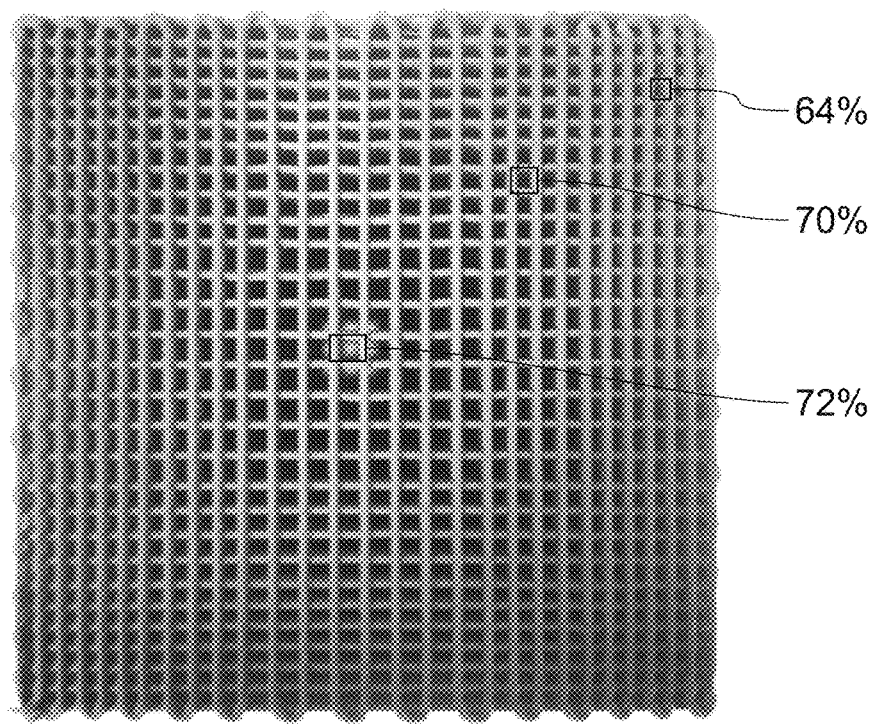
FIG. 7 represents a top view of a porous structure with same fiber disposition scheme as in FIG. 5, but having a prismatic shape.

In FIGS. 6 and 7 the values of local porosity are indicated. In both figures, there is a radial porosity gradient, in the plane of the layers. The change in porosity between the center and the periphery amounts to 8%.

It will be convenient to note that the fibers themselves may comprise a microporosity, e.g. porosity with pore size smaller than the size of the macropores as indicated above. Microporous fibers may be obtained by subjecting the fibers to a phase inversion process as e.g. described in WO 2009/027525, 5 Mar. 2009. Microporous fibers may be advantageous due to better adhesion of a coating on the fibers, such as a catalytic coating. The (microporous) fibers are otherwise solid fibers, i.e. they are advantageously not hollow.

The materials of which the porous structures according to aspects of the present disclosure are made include metals, ceramics, and composite materials, in particular those materials having good thermal conductivity. In porous structures that intended for us as catalytic supports, the catalyst can be embedded in the structure, e.g. by mixing the catalyst with the paste used for extruding the fibers. Suitable materials and catalyst are e.g. described PCT/EP2016/073443 filed on 30 Sep. 2016. Other suitable materials are described e.g. in WO 2009/027525 to VITO NV, 5 Mar. 2009, and in US 2011/0129640 to Beall et al., 2 Jun. 2011.

Example 1: Reaction Conversion

The graded structure shown in FIG. 6 (average (macro) porosity 66% and porosity change from 72% in the center to 64% at the periphery as calculated from Eq. 1) was compared to 3DFD monolithic structures with uniform (macro) porosity (respectively 70% and 74%) and packed bed conventional catalyst powder on a $CO_2$ methanation reaction experimentally. The catalyst powder had a $D_{90}$ particle size=25 μm (i.e. 90% by volume of the particles having a size smaller than or equal to 25 μm) as measured by laser diffractometry. Methanation, or catalytic conversion (hydrogenation) of carbon dioxide to methane, also called the Sabatier reaction. This reaction, is a well-known catalytic highly exothermic process ($\Delta H_{298K}$=165 kJ/mol). The 3DFD structure with 74% porosity was manufactured by extruding fibers comprising stainless steel powder with a 0.4 mm diameter nozzle (equivalent to fiber diameter a), stacking of the fibers as in FIG. 2 with constant spacing n of 1 mm between adjacent fibers within a layer. The structure with 70% porosity was manufactured with same process parameters as the 74% structure, except for n=0.8 mm. The stainless steel structures were coated with 12 wt % Ni/$Al_2O_3$ catalyst by dip-coating. A quartz tubular reactor (24 mm diameter and 100 mm length) was used and equipped with a K-type thermocouple that was installed at inlet and outlet sides of the quartz tube for continuous temperature measurement. Catalysts were packed in the middle of reactor and fixed with quartz wool. The reactor was placed in the middle of the furnace. To have the fair comparison of the samples with the different macroporosity, the same amount of catalyst was used for each experiment. Before the reaction test, catalysts were activated under a continuous flow of $H_2$/He (80/20%) at the total rate of 100 ml/min and temperature of 450° C. (heating rate 10° C./min) for 2 h under atmospheric pressure. After reduction, temperature of the furnace was adjusted to the reaction temperature under continuous flow of helium. Methanation reaction was performed at temperatures between 250 and 450° C. under atmospheric pressure. Carbon dioxide and hydrogen were continuously fed into the reactor together with helium carrier gas at the total rate of 100 ml/min with feed composition of $CO_2$:$H_2$:He=1:4:15.

Figure 11:
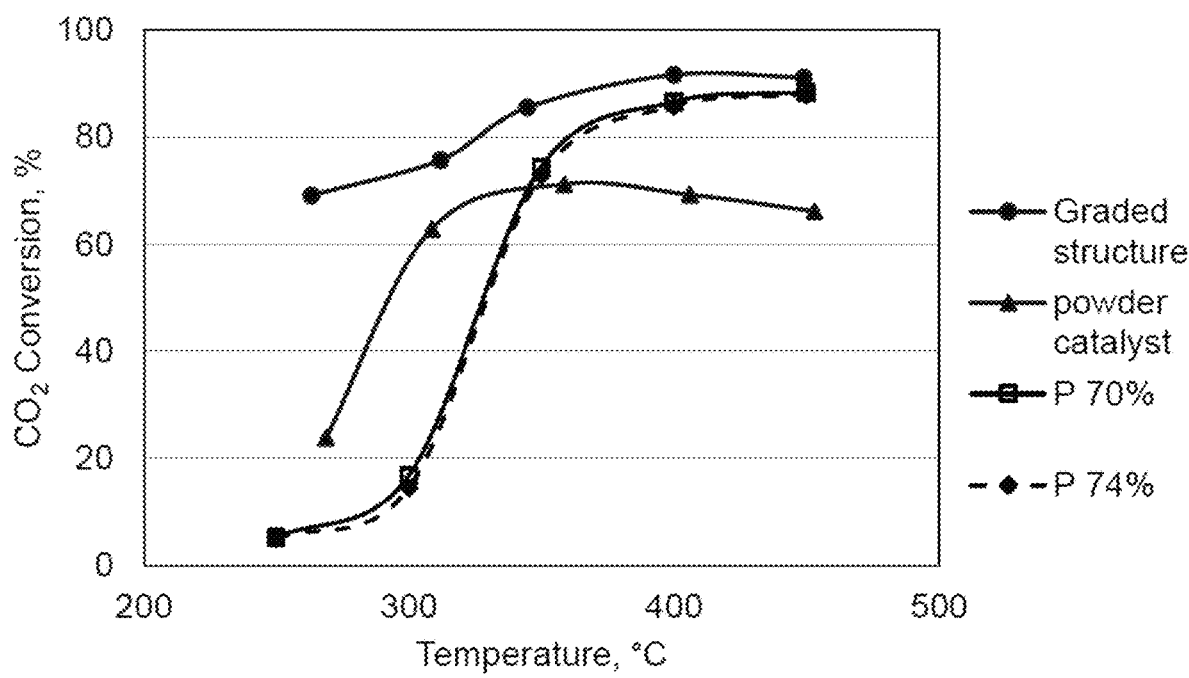
FIG. 11 represents a graph of carbon dioxide conversion versus temperature for different kinds of catalyst supports.

FIG. 11 shows the conversion results in $CO_2$ methanation reaction. It can be seen that temperature significantly affects the conversion of carbon dioxide. At temperatures above about 340° C., all 3DFD structured catalysts showed higher conversion (up to 90%) than that of the powdered catalyst (ca. 66%), while at lower temperatures only the graded structure showed an improved $CO_2$ conversion. This can be explained by its increased heat transfer properties. The structured catalyst with graded porosity showed about 85% $CO_2$ conversion at 350° C., whereas the homogeneous porosity structured catalyst and powdered catalyst showed about 72% and 71% $CO_2$ conversion, respectively.

Figure 12:
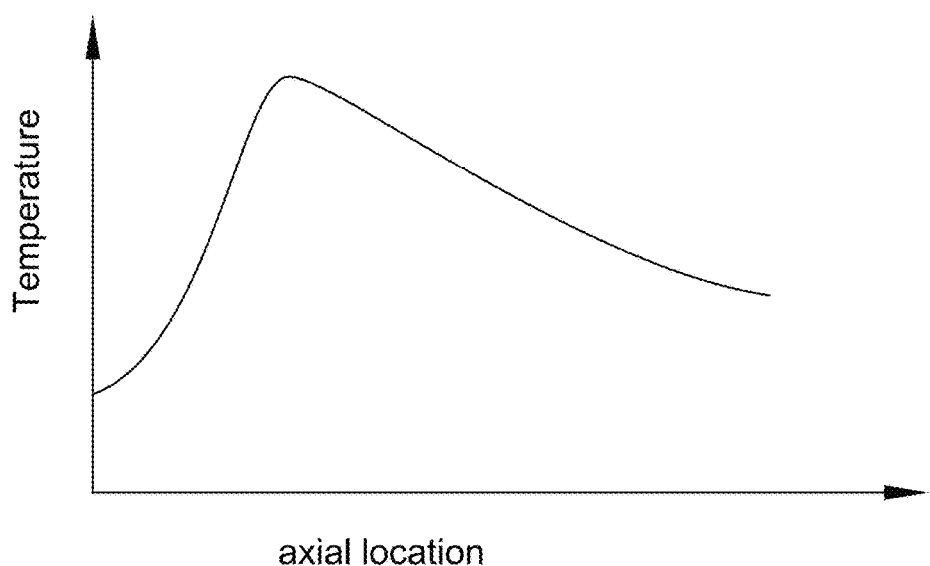
FIG. 12 represents a graph of a typical temperature profile of an exothermal reaction along the axial direction of a reactor in which a catalytic structure is arranged.

A typical temperature profile of an exothermal reaction along the axial direction (direction of flow 14) in the reactor will evolve as shown in FIG. 12, with increasing temperature from the inlet end to a maximum temperature somewhere between the inlet and the outlet, followed by a region in which temperature decreases with axial distance. An important conclusion that can be drawn from the results of FIG. 11 is that graded porous structures will allow faster reaction in the inlet zone. Simultaneously, a zone with improved heat conductivity between the inner parts of structure 15 and the wall 111 provides for better heat removal (in case of exothermal reactions). This helps to keep the Gibbs free energy ($\Delta G$) negative as long as the reaction does not achieve the thermodynamic equilibrium with an efficient heat removal. Consequently, maximum temperatures in the reactor will be lower, since part of the reaction has already taken place. This allows for easier controlling the temperature to remain below the temperature above which catalyst is deactivated. Another important advantage is that more efficient use is made of the volume of the porous structure (and hence of the catalyst), so that the fluid through flow can be increased for a same volume of the catalytic structures.

Additionally, providing a porosity gradient with higher density at peripheral zones of the structures adjacent the wall of the reactor vessel will allow for increased draining of heat to the wall. The resulting lower temperatures will not negatively affect conversion rate, since the graded structures according to aspects presented herein allow for higher conversion at these lower temperatures.

Example 2: Pressure Drop

The pressure drop $\Delta p$ through different kinds of porous structures was measured as a function of the superficial velocity using an electronic micro-manometer. Three structures were investigated: packed 3 mm diameter alumina beads, the graded structure identical to the one of example 1 and the structure with 74% uniform porosity identical to the one of example 1.

Air was used as a flow gas, experiments were performed at room temperature. The samples (20 mm diameter, 20 mm length) were centered in a 21 mm diameter tube. The samples were enwrapped with a Teflon tape bandage so as to prevent bypass flow. The inlet of the tube was covered with glass wool so as to have a homogeneous flow. Two holes with a diameter of 4 mm at top and bottom of the sample were connected to a micro manometer. The accuracy of the manometer was ±0.05 Pa. The inlet flow rate was controlled by a mass flow controller. The air superficial velocity was ranged between 0.1 and 2.7 m/s.

Figure 13:
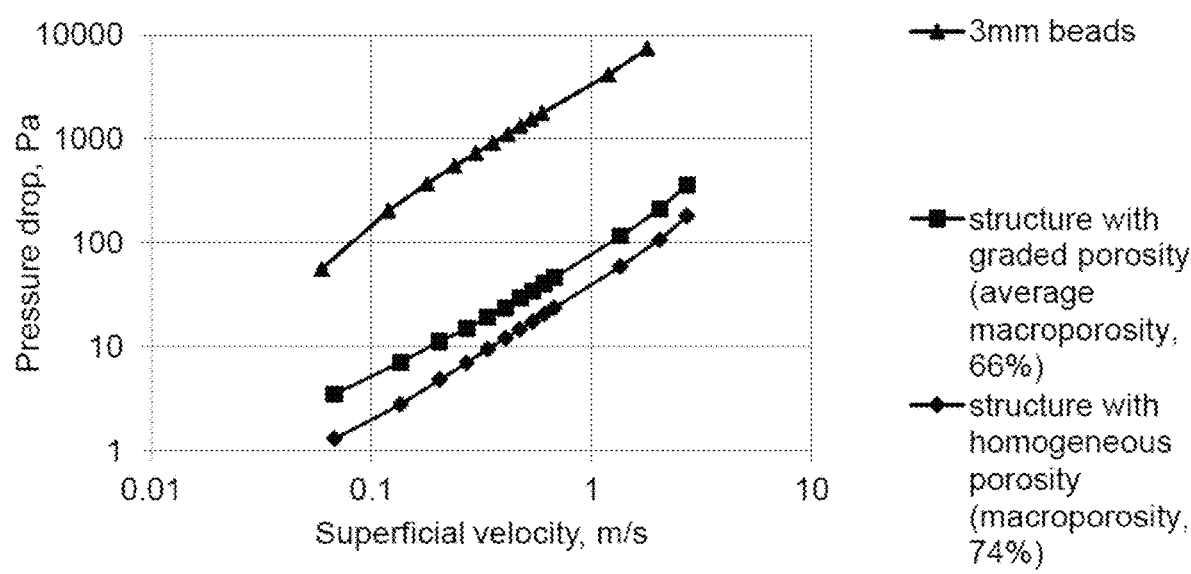
FIG. 13 represents pressure drop experiment results of different porous structures at different flow velocities.

FIG. 13 shows pressure drop experiment results at different velocities. It was observed that the pressure drop increases with decrease of (macro)porosity of the samples. The graded porosity sample shows a remarkably low pressure drop despite the lower average (macro)porosity as compared to the sample with homogeneous 74% (macro) porosity.

The invention claimed is:

1. A device for through-flow of a fluid, the device comprising:
    a vessel, comprising a wall, a fluid inlet, and a fluid outlet, wherein the fluid inlet and the fluid outlet define an overall flow direction, and
    a porous structure having interconnected pores arranged in the vessel between the fluid inlet and the fluid outlet, wherein the porous structure is coupled to the wall to provide for heat conduction between the porous structure and the wall, and wherein the porous structure comprises a porosity gradient along a first direction which is cross to the overall flow direction,
    wherein the porosity gradient develops along the first direction between a first porosity at a first location proximal to the wall and a second porosity larger than the first porosity at a second location remote from the wall relative to the first location, a difference between the second porosity and the first porosity being at least 4%.

2. The device of claim 1, wherein the first direction extends in a plane perpendicular to the overall flow direction.

3. The device of claim 1, wherein the difference between the second porosity and the first porosity is at least 6%.

4. The device of claim 1, wherein the porous structure has a uniform porosity along the overall flow direction.

5. The device of claim 1, wherein the porous structure has an average porosity between 50% and 80%.

6. The device of claim 1, wherein the first porosity is between 40% and 85% and wherein the second porosity is between 45% and 90%.

7. The device of claim 1, wherein the porous structure comprises a second porosity gradient along the overall flow direction.

8. The device of claim 7, wherein the second porosity gradient comprises a decreasing porosity from the fluid inlet towards the fluid outlet.

9. The device of claim 1, wherein the porous structure comprises an arrangement of fibers which are attached to one another, wherein the fibers are arranged in parallel layers, the layers being stacked.

10. The device of claim 9, wherein the fibers have a diameter between 20 µm and 20 mm.

11. The device of claim 9, wherein fibers of consecutive layers interpenetrate, wherein a ratio between an interpenetration depth between the fibers of the consecutive layers and a diameter of the fibers is between 0.1 and 0.5.

12. The device of claim 9, wherein a spacing between adjacent fibers of a same layer is between 10 µm and 50 mm.

13. The device of claim 12, wherein the spacing between the fibers in at least one layer changes between the first location and the second location to obtain the porosity gradient.

14. The device of claim 1, being a heat exchanger.

15. The device of claim 1, being a chemical reactor.

16. The device of claim 15, wherein the porous structure comprises a catalyst.

17. A method of converting carbon dioxide to methane, the method comprising using the device of claim 15, for catalytic conversion of carbon dioxide to methane.

* * * * *

UNITED STATES PATENT AND TRADEMARK OFFICE
CERTIFICATE OF CORRECTION

Page 1 of 1

PATENT NO. : 10,695,743 B2
APPLICATION NO. : 16/499222
DATED : June 30, 2020
INVENTOR(S) : Lidia Protasova et al.

It is certified that error appears in the above-identified patent and that said Letters Patent is hereby corrected as shown below:

On the Title Page

Under abstract "17 Claims, 7 Drawing Sheets" should read --18 Claims, 7 Drawing Sheets--.

In the Claims

Column 11, Line 30, insert the following claim:
--18. The device of claim 1, wherein the porous structure is monolithic.--.

Signed and Sealed this
Eighteenth Day of August, 2020

Andrei Iancu
*Director of the United States Patent and Trademark Office*